United States Patent [19]
Friedrich et al.

[11] Patent Number: 5,958,009
[45] Date of Patent: Sep. 28, 1999

[54] SYSTEM AND METHOD FOR EFFICIENTLY MONITORING QUALITY OF SERVICE IN A DISTRIBUTED PROCESSING ENVIRONMENT

[75] Inventors: Richard J. Friedrich, San Jose; Joseph J. Matinka, Sunnyvale; Tracy F. Sienknecht, Milpitas, all of Calif.

[73] Assignee: Hewlett-Packard Company, Palo Alto, Calif.

[21] Appl. No.: 08/807,734

[22] Filed: Feb. 27, 1997

[51] Int. Cl.[6] .................................................... G06F 13/00
[52] U.S. Cl. ........................ 709/224; 709/225; 709/226; 709/104
[58] Field of Search .................. 395/200.31, 800.28, 395/184.01; 709/201, 203, 218, 224, 225, 249, 226, 104

[56] References Cited

U.S. PATENT DOCUMENTS

| | | | |
|---|---|---|---|
| 5,067,107 | 11/1991 | Wade | 395/500 |
| 5,247,517 | 9/1993 | Ross et al. | 370/452 |
| 5,283,642 | 2/1994 | Sarr | 348/135 |

OTHER PUBLICATIONS

Ritithor, "Embedded Instrumentation for Evaluating Task Sharing Performance in Distributed Computing System", 1992, vol. 41 (2), pp. 316–321, IEEE Trans. on Instr. & Meas.

Abrams, "Design of a Measurement Instrument for Distributed Systems", 1987, IBM Research Report RZ.

Haban et al., "A Hybrid Monitor for Behavior and Performance Analysis of Distributed Systems", 1990, vol. 16(2), pp. 197–211, IEEE Trans. on Software Eng.

Lande et al., "Jewel: Design and Implementation of a Distributed Measurement System", 1992, vol. 3(6), pp. 657–671, IEEE Trans. on Parallel & Distr. Systems.

Friedrich et al., "Integration of Performance Measurement and Modeling for Open Distributed Processing", 1994, Proc. of the third IFIP TC 6/WG 6.1 Intl. Conf. on open distributed Processing 1994.

Friedrich et al. "Integration of performance Measurement and Modeling Open Distributed Processing", Proceedings of the 3rd IFIP TC 6/WG 6.1 International Conference on ODP, 1994.

*Primary Examiner*—Frank J. Asta
*Assistant Examiner*—Jason D. Cardone

[57] ABSTRACT

A measurement system and method of instrumenting a computer program for efficiently monitoring the quality of service in a distributed processing environment are described. A plurality of interconnected network nodes in a computer system with an application process operating on each network node is provided. At least one intelligent sensor is associated with each application process. Each intelligent sensor selectively collects data about at least one of the network node upon which the associated application process operates and the associated application process. An observer is associated with each application process and filters out unchanged and zero values from the data collected by the at least one intelligent sensor. A collector is logically associated with each network node. The intervalized collected data is asynchronously received into the collector periodically pushed from the observer. An analyzer is associated with the distributed processing environment and correlates the intervalized collected data. The intervalized collected data is asynchronously received into the analyzer periodically pushed from the collector.

10 Claims, 4 Drawing Sheets

SYSTEM AND METHOD FOR EFFICIENTLY MONITORING QUALITY OF SERVICE IN A DISTRIBUTED PROCESSING ENVIRONMENT

CROSS-REFERENCE TO RELATED APPLICATION

This patent application is related to a commonly-assigned patent application entitled "SYSTEM AND METHOD FOR CONTINUOUSLY MEASURING QUALITY OF SERVICE IN A FEDERATED APPLICATION ENVIRONMENT," filed on even date herewith, Ser. No. 08/807,073, the disclosure of which is incorporated herein by reference for all purposes.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to quality of service monitoring in a computer system and more particularly to a system and method for efficiently monitoring quality of service in a distributed processing environment.

Distributed processing environments offer distinct advantages over dedicated computer systems in terms of increased performance, portability, availability and resource sharing. However, monitoring the quality of service received by applications running in a distributed processing environment, including client-server and distributed applications, is a complex task. The mixture of operating systems and hardware platforms, the geographical distances between application components and the lack of programs to collect and correlate data from diverse sources must be considered when attempting to monitor the quality of service, particularly in terms of performance.

Prior art techniques for multiuser systems are poorly suited to addressing the problems of quality of service monitoring for client-server and distributed applications. Generally, these techniques were designed, deployed and managed in a centralized mainframe or minicomputer environment and consequently ignore communication costs incurred by delays between distributed application components and data interaction between independent software services.

Similarly, prior art techniques for network quality of service measuring are unsuitable. One such technique that employs software instrumentation for collecting and reporting on a large number of metrics, even if those metrics have not changed or are zero, is described in H. Rotithor, "Embedded Instrumentation for Evaluating Task Sharing Performance in a Distributed Computing System," IEEE Trans. on Instr. and Meas., Vol. 41, No. 2, pp. 316–321 (April 1992). The perturbation of this type of quality-of-service monitor on the system under measure is substantial due to the flooding of the distributed components with packets containing quality-of-service information and it becomes difficult for a user to comprehend the implications of the collected data. The measurement tools themselves significantly impact and degrade network performance, rather than helping to analyze or increase the quality of service and performance. Moreover, due to the perturbation effect, this type of technique cannot scale to monitor large networks with, for instance, thousands of individual computer nodes.

Prior art techniques that minimize the perturbation effect on the system under measure, but fail to measure internal software state, are described in U.S. Pat. No. 5,067,107 to Wade entitled "Continuous Computer Performance Measurement Tool Reduces Operating System Produced Performance Data for Logging into Global, Process and Workload Files;" M. Abrams, "Design of a Measurement Instrument for Distributed Systems," IBM Research Report RZ 1639 (October 1987); D. Haban et al., "A Hybrid Monitor for Behavior and Performance Analysis of Distributed Systems," IEEE Trans. on Software Engr., Vol. 16, No. 2, pp. 197–211 (February 1990) and F. Lange et al., "JEWEL: Design and Implementation of a Distributed Measurement System," IEEE Transactions on Parallel and Distributed Systems, Vol. 3, No. 6, pp. 657–671 (November 1992). Moreover, as these systems employ, at least in part, hardware-based solutions, the incremental cost for implementation is prohibitively high in a large distributed environment.

A prior art technique for defining an efficient measurement infrastructure for a performance measurement system for heterogenous distributed environments is disclosed in R. Friedrich et al., "Integration of Performance Measurement and Modeling for Open Distributed Processing," Int'l Fed. of Info. Proc., Brisbane, Australia (February 1995). The system as disclosed teaches using asynchronous sensor access and control and data collection interfaces, but fails to define uniform application programming interfaces operable on a plurality of heterogenous network nodes. Moreover, the system as disclosed provides an overview but fails to describe detailed theory of operation principles.

Prior art techniques that concentrate only on individual component subsystems and fail to capture the entire picture of the distributed processing environment include the OpenView Network Manager and GlancePlus System Manager, both products by the Hewlett-Packard Company, Palo Alto, Calif. These techniques collect a restricted set of data for network resource consumption, such as links, routers and similar components, and for operating system resource consumption, such as central processing unit, memory, disk and related hardware components, respectively. These techniques collect data based on individual system events which result in excessive resource usage and overhead for supporting operational control of distributed application environments. Furthermore, neither provide a correlated, end-to-end measurement of the quality of service for client-server or distributed applications.

Therefore, there is a need for a quality-of-service monitoring method and system which provides a pervasive measurement infrastructure suited to monitoring the quality of service and performance in a distributed processing environment. There is a further need for a quality-of-service monitoring system and method able to correlate application resource usage across network nodes. Also, there is a need for a quality-of-service monitoring system and method capable of judiciously reporting data to minimize collection and processing overhead on networks, thereby incurring a substantially minimal perturbation on the system under measure.

SUMMARY OF THE INVENTION

It is, therefore, an object of the present invention to provide a quality-of-service measurement system and method for efficiently monitoring the quality of service for client-server and distributed applications.

It is a further object of the present invention to provide a quality-of-service measurement system and method for providing an integrated, correlated view of client-server and distributed applications.

It is a further object of the present invention to provide a system and method for locating and measuring application server response times, preferably at a selectable granularity level, such as on a per function basis.

According to the invention, this object is accomplished by using a hierarchical structuring in software of intelligent sensors, observers, collectors and analyzers associated with each application process for providing a correlated view of quality of service and performance in a distributed processing environment. Each intelligent sensor collects data exceeding temporal and quantitative thresholds. Each observer periodically "pushes" collected sensor data to a collector after eliminating transfer of unchanged or zero values. Each collector periodically "pushes" collected observer data to one or more analyzers for correlation and viewing.

The present invention is a software architecture that facilitates the routine measurement of performance metrics on distributed objects. Furthermore, it provides a measurement infrastructure that collects and transports data independent of the underlying distribution mechanism.

The foregoing and other objects, features and advantages of the invention will become more readily apparent from the following detailed description of a preferred embodiment of the invention which proceeds with reference to the accompanying drawings.

The APPENDIX is a listing of pertinent portions of code for the header files defining the standardized application programming interfaces for use in implementing the present invention.

DETAILED DESCRIPTION

Figure 1:
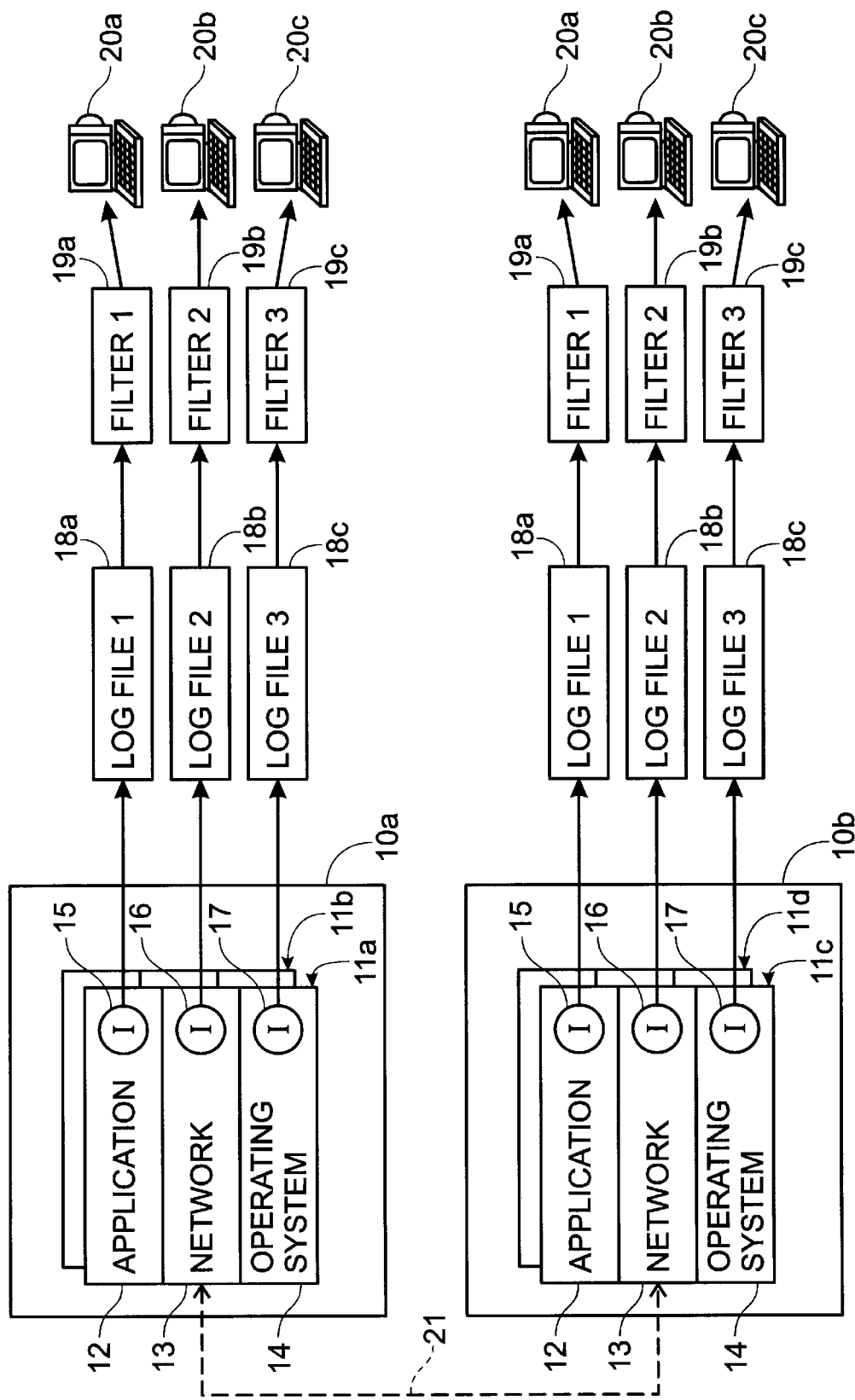
FIG. 1 is a block diagram of a prior art quality-of-service monitoring system for interconnected network nodes.

FIG. 1 shows a block diagram of a prior art quality-of-service monitoring system for interconnected network nodes. A plurality of network nodes 10a, 10b interconnected over network 21 each execute a plurality of independent processes 11a, 11b, 11c, 11d. Each process is logically separated into application 12, network 13 and operating system 14 layers with some form of instrumentation 15, 16, 17 respectively associated with each layer. Instrumentation is specialized software incorporated into programs or libraries to collect or calculate quality-of-service metrics. Here, the instrumentation 15, 16, 17 is used to collect independent and non-correlated quality-of-service data regarding the state of its respective layer 12, 13, 14 for each process 11a, 11b, 11c, 11d running on each network node 10a, 10b. Periodically, the data is stored into log files 18a, 18b, 18c and filtered by filters 19a, 19b, 19c. Separate workstations 20a, 20b, 20c are used to extract and display the collected data. Some prior art systems, however, can display the data on a single workstation (not shown).

There are several drawbacks with this system. The instrumentation 15, 16, 17 operates and reports data independently of each peer process 11a, 11b. Correlated data for processes 11a, 11b that interact on the same network node 10a is not determined or displayed. Furthermore, the instrumentation 15, 16, 17 fails to account for processes 11a, 11c that interact over distributed network nodes 10a, 10b, such as client-server or distributed applications, via network 21 or similar means. Thus, data correlation for the quality of service pertaining to the distributed aspects of the environment is not possible.

Figure 2:
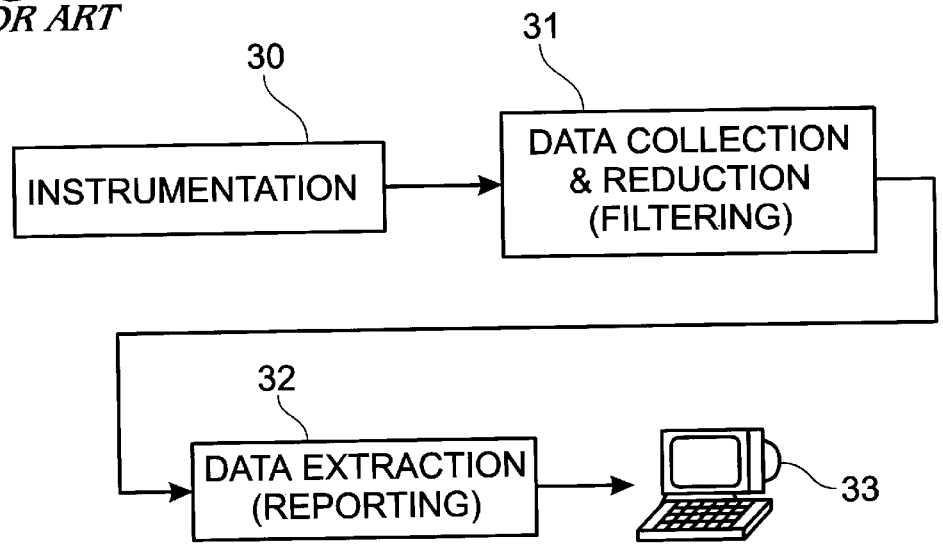
FIG. 2 is a data flow diagram of the prior art quality-of-service monitoring system of FIG. 1.

FIG. 2 shows a data flow diagram of the prior art quality-of-service monitoring system of FIG. 1. Instrumentation 30 (shown as instrumentation 15, 16, 17 in FIG. 1) collects data about the state of the applications running on the network node. A data collection and reduction process 31 periodically polls the instrumentation 30 for raw data. In response, the instrumentation 30 reports all data collected, including unchanged and zero values. Upon receipt, the raw data is stored (shown as log files 18a, 18b, 18c in FIG. 1) and filtered (shown as filters 19a, 19b, 19 in FIG. 1) by the data collection and reduction process 31. Finally, the filtered data is forwarded to a data extraction process 32 (shown as workstations 20a, 20b, 20 in FIG. 1) which reports the quality-of-service metrics to a user on a workstation 33. The overhead of processing each individual system event limits its utility as a quality-of-service monitor to distributed computing environments.

This highlights several further drawbacks with this system. First, by polling the instrumentation 30, the data collection and reduction process 31 can double the number of messages used to collect raw data and result in unnecessary transfers when no new data is available. In a large distributed environment with several processes running on each network node and each process including one or more instrumentation points, the burden of polling on the network is substantial. Second, raw data packets report unchanged and zero values needlessly. Moreover, the system requests raw data whether or not it is necessary and regardless of whether the raw data contains any values of importance. The system must collect, transmit, filter and extract useful data from all reported data. The collection and processing overhead required to continuously perform these operations on packets containing valuable as well as useless data is substantial. As a result, this prior art technique incurs a significant yet avoidable perturbation effect on the system under measure and renders it practically unusable for real world environments.

An embodiment of the present invention is a measurement system for efficiently monitoring the quality of service in a distributed processing environment. A plurality of interconnected network nodes in a computer system with an application process operating on each network node is provided. At least one intelligent sensor is associated with each application process. Each intelligent sensor includes means for selectively collecting data about at least one of the network node upon which the associated application process operates and the associated application process. An observer is associated with each application process and includes means for eliminating transfer of unchanged and zero values from the data collected by the at least one intelligent sensor to form intervalized data. A collector is logically associated with each network node. Means for asynchronously receiving the intervalized collected data into the collector periodically pushed from the observer is provided. An analyzer is associated with the distributed processing environment and includes means for correlating the intervalized collected data. Means for asynchronously receiving the intervalized collected data into the analyzer periodically pushed from the collector is provided.

A further embodiment of the present invention is a method of instrumenting a computer system for efficiently monitoring the quality of service in a distributed processing environment. The distributed processing environment comprises a plurality of interconnected network nodes with an application process operating on each network node. At least one intelligent sensor is associated with each application process. Each intelligent sensor selectively collects data about at least one of the network node upon which the associated application process operates and the associated application process. An observer is associated with each application process and filters out unchanged and zero values from the data collected by the at least one intelligent sensor. A collector is logically associated with each network node. The intervalized collected data is asynchronously received into the collector periodically pushed from the observer. An analyzer is associated with the distributed processing environment and correlates the intervalized collected data using the analyzer. The intervalized collected data is asynchronously received into the analyzer periodically pushed from the collector.

A further embodiment of the present invention is a method for providing correlated quality-of-service data in a distributed processing environment. The distributed processing environment comprises a plurality of interconnected network nodes and an analyzer process. Each of the network nodes comprises at least one application process and a collector process. Each application process has at least one intelligent sensor and an observer process. Data on the application process is collected using the intelligent sensor whereby the collected data exceeds an information level threshold associated with the intelligent sensor. Unchanged or zero-valued data is intervalized and eliminated from transfer of the collected data using the intelligent sensor. The collected data for each of the intelligent sensors is periodically pushed using the observer to a collector data interface imported by the collector. The intervalized collected data for each of the observers is periodically pushed using the collector to an analyzer data interface imported by the analyzer. A correlated view of the intervalized collected data is generated using the analyzer.

The present invention provides information for quality of service and performance monitoring, distributed application design and deployment, load balancing and capacity planning. A common set of quality-of-service metrics and instrumentation are provided to ensure consistent collection and reporting across heterogeneous nodes. Standard application programming interfaces are defined to ensure pervasive support for quality-of-service metric measurement. In the described embodiment, the system is capable of monitoring distributed technologies, such as the Open Group's Distributed Computing Environment (DCE) and the Common-Object Request Broker Architecture (CORBA). The present invention also supports integrating quality-of-service measurement interfaces from external sources, such as host operating systems and networks, into a single unified measurement infrastructure. This results in a seamless, integrated view of the behavior of client-server and distributed applications in a heterogenous environment.

Figure 3:
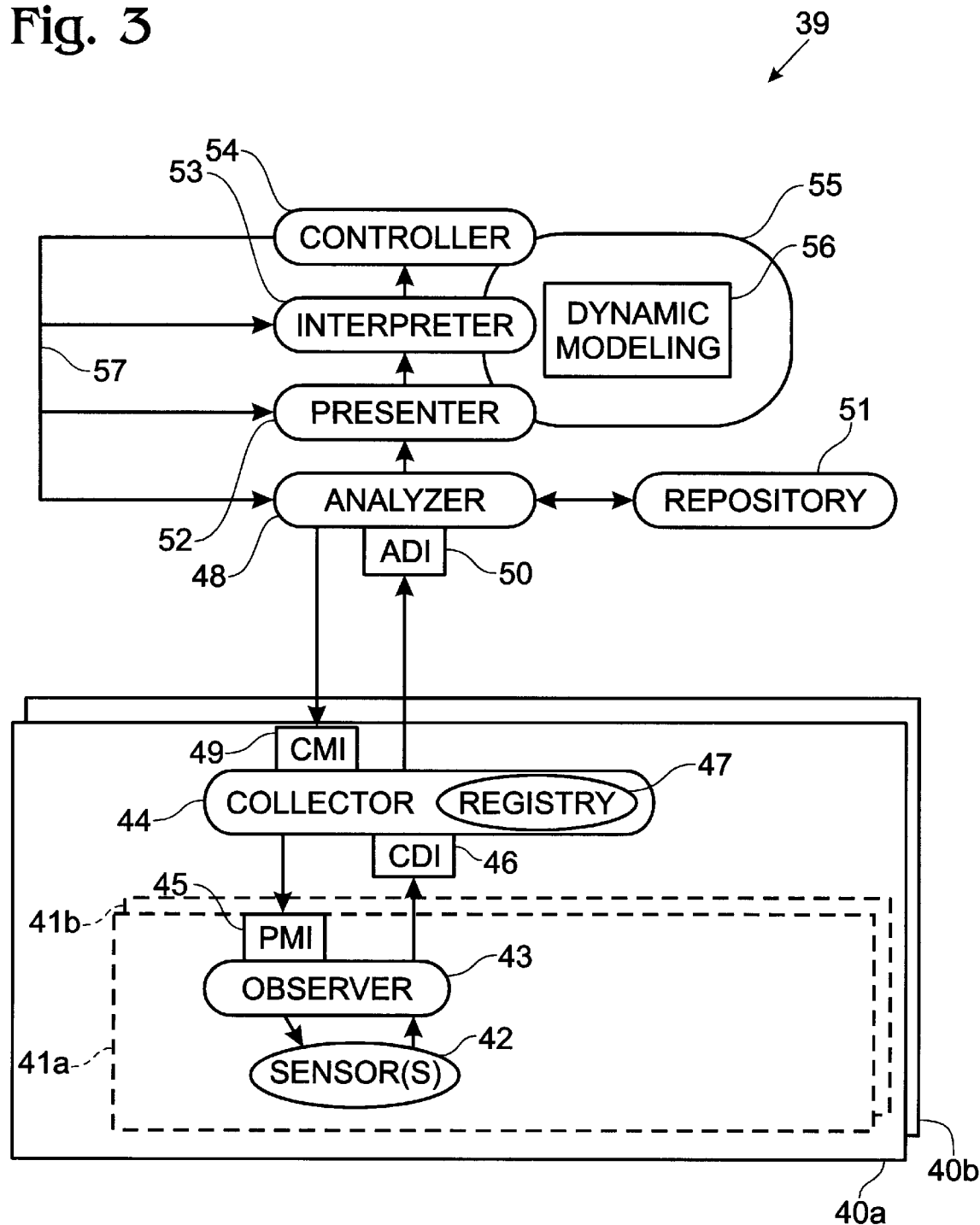
FIG. 3 is a block diagram of a system for efficiently monitoring quality of service in a distributed operating environment in accordance with the present invention.

FIG. 3 shows a block diagram of a system for efficiently monitoring quality of service in a distributed processing environment containing multiple nodes 40a, 40b in accordance with the present invention. Each node includes a central processing unit, memory, input/output interface, such as a keyboard and display and network connection interface. An operating system is run by the central processing unit for controlling system resources and executing software in response to user commands.

The basic quality-of-service measurement infrastructure 39 is structured as a hierarchy of objects. At the base of the hierarchy, one or more sensors 42 are incorporated into each of one or more application processes 41a, 41b that execute on network nodes 40a, 40b. The sensors 42 for each application process 41a, 41b provide data to a single observer 43 associated with that application process 41a, 41b. The observers 43 for each of the application processes 41a, 41b provide data to a single collector 44. The collectors 44 provide data to one or more analyzers 48 which can be part of or entirely separate from the network. The observers 43, collectors 44 and analyzer 48 exchange data and control information through two types of standardized application programming interfaces. Asynchronous sensor access and control interfaces are "exported" (from the standpoint of a sending process) by the observers 43 and collectors 44 to provide a passive communication channel for receiving configuration information and commands. Asynchronous data collection interfaces are "imported" (from the standpoint of a receiving process) by the observers 43 and collectors 44 to provide a passive communication channel for receiving assimilated data.

Figure 5:
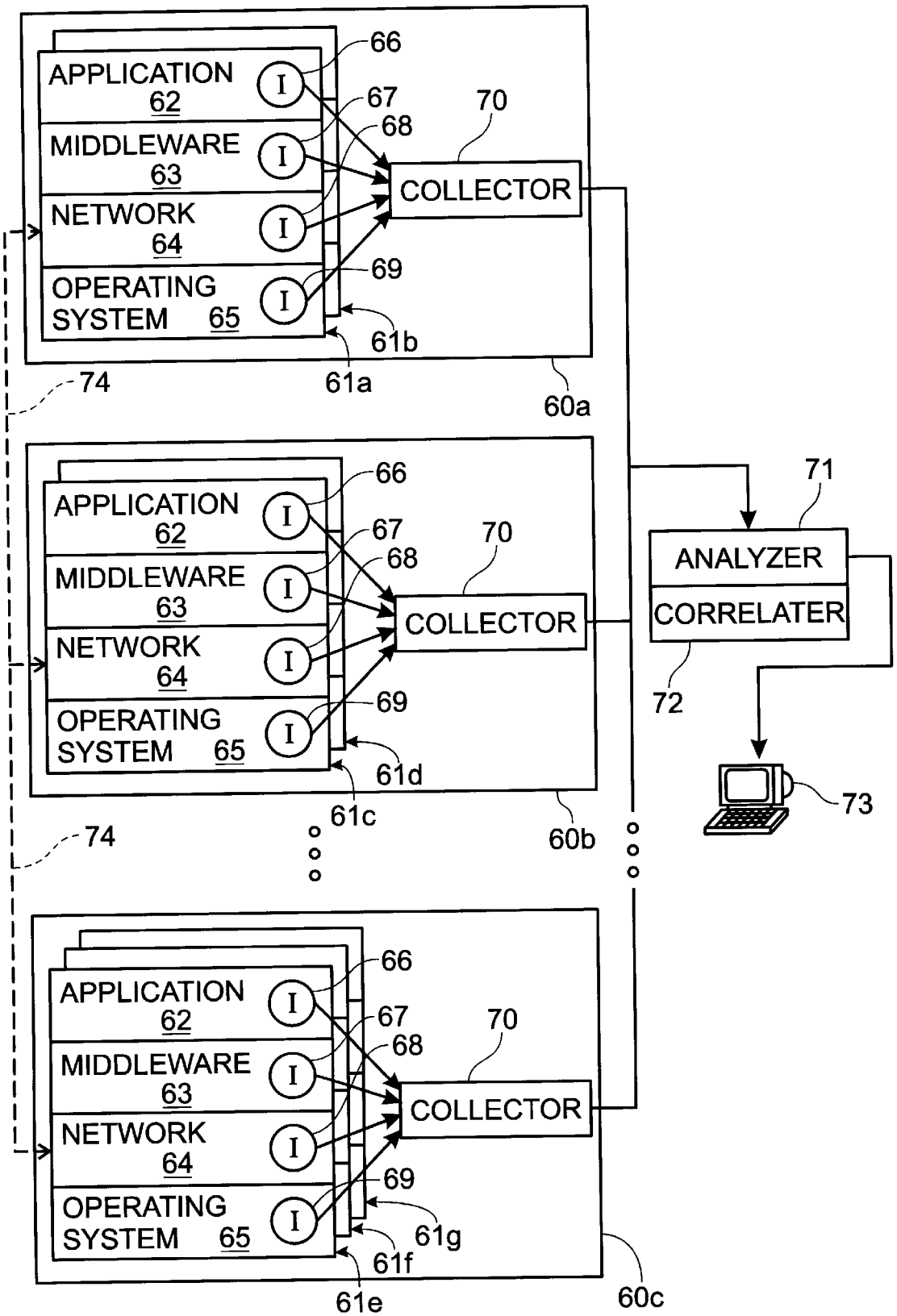
FIG. 5 is a block diagram of a system for providing end-to-end quality-of-service measurements for client-server and distributed applications in accordance with the present invention.

Each of the network nodes 40a, 40b can include client or server objects executing within application processes 41a, 41b or could each be executing on separate network nodes as a distributed application over a network (such as shown in FIG. 5). Instrumentation in the form of one or more intelligent sensors 42 is incorporated into each of the application processes 41a, 41b through such means as embedding or encapsulation. Each sensor 42 is an application process-level object which is an instance of a general quality-of-service metric tailored to perform a specific function. Preferably, the sensors 42 calculate and buffer primitive statistical quantities, such as counts, summations or interval times, and defer the computation of more complex statistics, such as moments and histograms, to higher-level objects, as further described hereinbelow, to minimize processing overhead.

The sensors 42 are optimized to maximize reported information and minimize collection overhead. Ordinarily, they collect application quality-of-service data, such as response time, throughput, utilization and queuing time. Each sensor 42 has a control interface (not shown) that allows adjustment of the data collection overhead by configuring the statistical granularity of the collected data and the frequency of its reporting. The sensor information levels are shown in Table 1.

Table 1
Sensor Information Levels

| Level | Description |
| --- | --- |
| 0 | Off |
| 1 | Threshold |
| 2 | Means |
| 3 | Minimums and Maximums |
| 4 | First moments of a distribution |

-continued

| Level | Description |
|---|---|
| 5 | Second moments of a distribution |
| 6 | Histogram |

The lowest information level, "Off" (Level 0), corresponds to instantiated but inactive sensors and incurs virtually no overhead. The "Threshold" information level (Level 1) is generally used for monitoring network quality of service and performance. Each sensor 42 can be configured with definable thresholds. Ordinarily, each sensor 42 reports data only when its threshold is exceeded, although the threshold can be overridden on demand to force immediate reporting. For example, data is only reported when 90% of all response times exceed 10 seconds. The other information levels support various statistical quantities that provide insights into the load and performance distribution of the collected data. Primitive quantities are collected for levels 2, 3, 4, and 5. These quantities can be processed by an analyzer 48 to convert them into statistical information. This reduces the overhead of the sensor 42 by deferring compute intensive processing to another network node where the analyzer 48 executes. Level 2 collects value summaries and a count of events so that the mean value can be computed. Level 3 collects the minimum and maximum value measured during the time interval. Level 4 collects the sum of the squares of the values so that the first moment in the distribution of this data can be computed. Level 5 collects the sum of the cubes of the values so that the second moment in the distribution of this data can be computed. Level 6 measures values and stores frequency of events in the relevant bin of a histogram.

Four categories of standard sensors 42 are defined: timers provide interval times; counters record the number of occurrences or the state of an event; normalizers record events per unit time or unit count; and composers return an arbitrary structure for use by higher level objects. For example, normalizers transform values collected by timers or counters into rates. In addition to standard sensors 42, an application process 41a, 41b can define custom sensors that supplement the standard sensors by recording, for instance, application-specific behavior or network node state, such as described in the related, commonly-assigned patent application entitled "SYSTEM AND METHOD FOR CONTINUOUSLY MEASURING QUALITY OF SERVICE IN A FEDERATED APPLICATION ENVIRONMENT," referenced hereinabove. Custom sensors support extensible measurement of business or organizational units of work that are not available within the standard distribution infrastructure.

The observer 43 is also an application process-level object which provides a control point for one or more associated sensors 42. There is one observer 43 for each application process 41a, 41b. Each observer 43 off-loads from its associated sensors 42 the need to manage and transmit collected data by periodically "pushing" the intervalized data generated by its sensors 42 to a collector 44 through a Collector Data Interface 46, as further described hereinbelow. Ordinarily, each observer 43 reports data only when its time interval has expired, although the time interval can be overridden on demand to force immediate reporting. The observer 43 helps to minimize processing overhead by enabling the sensors 42 to defer some computations in favor of the observer 43. The observer 43 supports sensor registration and unregistration and the collected data from multiple sensors 42 is transferred simultaneously to minimize overhead.

The observer 42 exports a node transparent sensor access and control interface, named the Performance Measurement Interface (PMI) 45, as further described hereinbelow in the APPENDIX.

The collector 44 is a network node-level object which performs local network node data management and control for one or more associated observers 43. There is preferably one collector 44, although multiple collectors 44 or no collector 44 are acceptable configurations. For the zero collector 44 configuration, a remote collector (not shown) logically associated with the network node 40a would provide access to the sensor 42. Two or more collectors 44 can be used for improved efficiency. Each collector 44 accumulates sensor data from observers 43 through a Collector Data Interface 46. It "pushes" the accumulated sensor data to an analyzer 48 through an Analyzer Data Interface 50, as further described hereinbelow. The accumulated data from the observers 43 is transferred simultaneously to minimize collection overhead. Ordinarily, each collector 44 reports data only when its time interval has expired, although the time interval can be overridden on demand to force immediate reporting. The collector 44 also controls each sensor 42 through its associated observer 43 via the PMI 45 and provides a sensor registry 47 that contains the states of all registered and unregistered sensors 42.

The collector 44 exports a network transparent sensor access and control interface, named the Collector Measurement Interface (CMI) 49, as further described hereinbelow in the APPENDIX. The CMI 49 is a network communication interface which the analyzer 48 uses to communicate with collectors 44 located anywhere in the network for requesting sensor data and specifying sensor configurations.

The collector 44 imports an observer data collection interface, named the Collector Data Interface (CDI) 46, as further described hereinbelow in the APPENDIX. Each observer 43 summarizes the sensor data collected by the associated sensors 42 and periodically "pushes" the collected data to the collector 44 using the CDI 46. The CDI 46 eliminates the need for polling of sensors 42 for data by providing an asynchronous data transport channel.

The analyzer 48 analyzes the data gathered by one or more associated collectors 44 within a specific network domain, that is, a network node or cluster of nodes. The analyzer 48 filters and analyzes the collected data by applying statistical routines to compute the distributional characteristics of the collected data, correlating data from application elements residing in different network nodes 40a, 40b and preparing the data for expert system or human analysis. Simple operations, such as counting events, are most efficiently performed by the sensors 42 or observers 43; the analyzer 48, however, performs complex statistical calculations, such as computing moments and histograms. In addition, any analyzer 48 can request subsets of sensor data from multiple collectors 44 and multiple analyzers 48 can access any specific collector 44. Each analyzer 48 gathers data from the associated collectors 44 through the Analyzer Data Interface 50, as further described hereinbelow. The analyzer 48 provides the data to higher-level objects, such as a presentation service for visualization or an interpretation service for autonomous agent operation, examples of which are presented hereinbelow. A repository 51 is associated with the analyzer 48 and is used for storing configuration data for the sensors 42, observers 43 and collectors 44 operating on each network node 40a, 40b in the network. Finally, the analyzer 48 provides the basis for dynamic end-to-end quality-of-service negotiation and monitoring.

The analyzer 48 exports a collector data collection interface, named the Analyzer Data Interface (ADI) 50, as further described hereinbelow in the APPENDIX. The data collected from multiple sensors 42 via their associated observers 43 are batched into a single packet by the collector 44 and "pushed" in bulk to the analyzer 48 through the ADI 50. This interface minimizes the number of network packets exchanged between the collector 44 and the analyzer 48. Moreover, as the collector 44 periodically "pushes" sensor data to the ADI 50, the collection overhead otherwise incurred by the analyzer 48 to periodically poll each of the collectors 44 for updates is avoided. This technique improves scalability to large networks and reduces collection and processing overhead. However, each collector 44 must use self-describing data techniques to facilitate the interpretation of data formats since each collector 44 and analyzer 48 may reside on separate, heterogenous network nodes 40a, 40b.

To summarize, it is critical that the collection of quality-of-service data not significantly impact the application processes and the system under measurement. Optimization techniques are employed in the described embodiment to minimize network bandwidth utilization and to improve scalability to large networks. Data is reported only when the information level thresholds are violated. Intelligent sensors 42 report summarized data periodically, but do not report unchanged data or zero values. Aggregated sensor data at the observer 43 and collector 44 levels are transported in bulk using data "pushing."

The intelligent sensors 42, observers 43, collectors 44 and analyzer 48 comprise the basic quality-of-service measurement infrastructure. Additional, higher-level objects can be added to complement operation of the measurement infrastructure. By way of example, the objects can include any or all of the following, also shown in FIG. 3.

A presenter 52 can be used to interactively produce reports, displays and alarms by supporting a user interface on a workstation (not shown). The presenter 52 receives intervalized and analyzed data from the analyzer 48 and presents a logically integrated view that resembles that of an application process executing on a single, centralized network node. Visualization techniques are necessary to provide efficient online analysis of the collected data.

An interpreter 53 is an intelligent entity, either human or expert system, that evaluates and identifies complex relationships between the data, such as obtained using the presenter 52, and the environment and draws meaningful interpretations. The interpreter 53 can rely on extrinsic resources 55, such as dynamic modeling 56 of a hypothetical network, to estimate and compare measured data with quality-of-service requirements.

Finally, a controller 54 sets and modifies system parameters and configurations based on an interpretation of the monitored quality-of-service data, such as provided by the interpreter 53. Together with the measurement system and dynamic models, the controller 54 creates a closed feedback loop necessary for providing a self-adapting system that can manage itself with minimal human intervention.

The basic measurement infrastructure of the described embodiment has been implemented as an object-oriented computer program written in the C++ programming language, although any programming language, object-oriented or otherwise, would be suitable. The APPENDIX is a listing of pertinent portions of code for the header files defining the standardized application programming interfaces for use in implementing the present invention. The sensors 42, observers 43, collectors 44 and analyzer 48 were written in software to conform to the Open Group's Distributed Computing Environment (DCE) model because of availability and commercial interest. However, the use of the DCE as a distribution infrastructure impacted only the implementation of the sensors 42 and observers 43, but not the interface. The sensors 42 were developed and embedded within a DCE runtime library (RTL) which is linked during program compilation with all application processes 41a, 41b. Thus, the standard sensors 42 were made available without having to modify application process, client or server source code. The observers 43 were also implemented in the RTL. The collectors 44 were implemented as daemon processes that communicated with all the observers 43 via interprocess communication through the PMI 45 and CDI 46. The analyzer 48 was also implemented as a daemon process that communicated with all the collectors 44 in the network via remote procedure calls.

Figure 4:
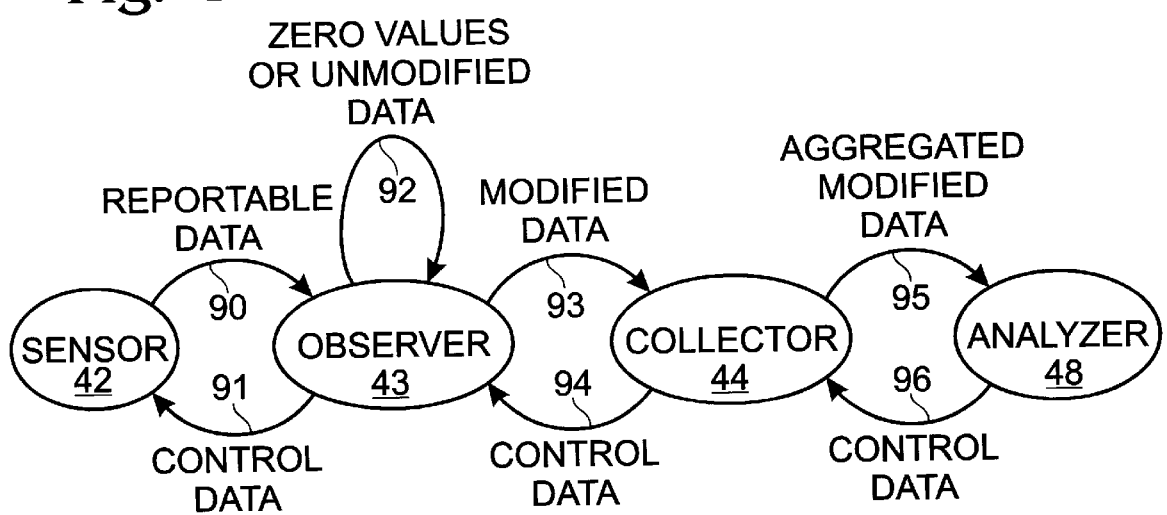
FIG. 4 is a state diagram of the basic measurement infrastructure of the quality-of-service monitoring system of FIG. 3.

FIG. 4 shows a state diagram of the basic measurement infrastructure of the quality-of-service monitoring system of FIG. 3. Raw data is observed by a "probe" in each sensor 42. A sensor probe is a software construct referring to a platform-dependent request for raw data, such as a function call to the operating system to obtain processor performance data. Whenever the threshold information level for a sensor 42 has been exceeded, that is, both the time interval has elapsed and the threshold value has been satisfied, the reportable data 90 is collected by the sensor 42 into its local process address space. Whenever two or more analyzers 48 configure a sensor 42 with different threshold values, this collection technique is modified so that modified data 93 is written to collector 44 and collector 44 performs the test for threshold exceptions. Periodically, each observer 43 retrieves the reportable values 90 from the address space for consolidation with data from other associated sensors 42. In turn, each observer 43 copies control data 91 into the configuration address space for each sensor 42. Whenever the time interval for an observer 43 has elapsed, only the modified data 93 for the associated sensors 42 is "pushed" to the collector 44. Zero values or unmodified data 92 are discarded by the observer 43. In turn, each collector 44 sends control data 94 to each observer 43. Whenever the time interval for a collector 44 has elapsed, aggregated modified data 94 for all of the associated observers 43 is "pushed" to the analyzer 48. In turn, each analyzer 48 sends control data 95 to each collector 44. If the analyzer 48 or any other higher-level object (not shown) requires immediate reporting, the request is conveyed downwards as control data and the same data as ordinarily reported is returned, only it is reported immediately.

FIG. 5 shows a block diagram of a system for providing end-to-end quality-of-service measurements for client-server and distributed applications in accordance with a further embodiment of the present invention. The system is organized into a hierarchy of objects. The network nodes 60a, 60b, 60c execute a plurality of application processes 61a, 61b, 61c, 61d, 61e, 61f, 61g, each of which are logically divided into application 62, middleware 63, network 64 and operating system 65 layers, each with an associated intelligent sensor 66, 67, 68, 69, respectively. Each of the network layers 64 shares a logical connection 74 over a physical network. The intelligent sensors 66, 67, 68, 69 each consist of the sensors 42, observer 43 and PMI 45 shown in FIG. 3. The sensors 66, 67, 68, 69 for each application process 61 a send their collected data to a collector 70 which is responsible for the entire network node 60a. In turn, the collector 70 sends the collected sensor data to an analyzer 71 which is responsible for the entire network. The analyzer 71, together with the correlater 72, filters and correlates the data, reconfigures sensor measurement parameters if necessary, and prepares the correlated data for presentation on a workstation 73. The analyzer 71, correlater 72 and workstation 73 can be located anywhere in the networked environment.

Client-server and distributed application quality of service and performance data is captured and monitored as follows. By way of example, assume that the application process 61a running on the network node 60a is a client object and the application process 61c running on the network node 60b is a server object. The client object 61a communicates with the server object 61b via a logical connection 74 through their respective network layers 64. The sensors 67 in their respective middleware layers 63 can capture data pertaining to the client-server interactions by observing the information exchanged between the application 62 and network 64 layers in their respective application processes. This data, from both the client object 60a and the server object 60c running on separate network nodes 60a, 60b, respectively, is eventually forwarded to the correlater 72 for consolidation, correlation and reporting in an integrated manner.

By way of further example, assume that the application process 61a running on the network node 60a and the application process 61c running on the network node 60b together comprise a distributed application. The component application processes 61a, 61c communicate with each other via a logical connection 74 through their respective network layers 64. The sensors 67 in their respective middleware layers 63 can capture data pertaining to the component interactions by observing the information exchanged between the application 62 and network 64 layers in their respective application processes. This data, from both of the component application processes 60a, 60c running on separate network nodes 60a, 60b, respectively, is eventually forwarded to the correlater 72 for consolidation, correlation and reporting in an integrated manner.

The present invention presents several unique quality-of-service monitoring capabilities. First, geographically distributed software processes can be measured, correlated and displayed in a single, integrated view. Second, sensors are uniquely identifiable and sensor data is timestamped so that the data can be correlated. Finally, the placement of sensors in the middleware, such as shown in FIG. 5, supports the collection of quality-of-service metrics for application processes on heterogeneous operating system platforms and eliminates the need to have specialized instrumentation in each host operating system.

Using the terminology of the Reference Model for Open Distributed Processing, the present invention provides correlated quality-of-service metrics across objects (application components) and their channels (network communication), integrates disparate performance measurement interfaces from a node's nucleus object (operating system), and efficiently transports collected data from network nodes to management stations. The data collected is useful to application designers, model developers, quality-of-service monitors and distributed application managers.

In summary, the present invention can correlate application resource usage across nodes; locate or measure application server response times; monitor application servers on a per function basis; judiciously report data to minimize collection overhead for large networks; provide a single, integrated, correlated view of a distributed application; and large networked environments (exceeding a million network nodes) can be efficiently monitored.

Having described and illustrated the principles of the invention in a preferred embodiment thereof, it should be apparent that the invention can be modified in arrangement and detail without departing from such principles. We claim all modifications and variations coming within the spirit and scope of the following claims.

```
APPENDIX: applciationm programming interfaces source code
//---------------------------------------------------------------------------
//
// File:         collector.h
// Description:  Collector class definitions.
//
// Language:     C++
//
// © Copyright 1997, Hewlett-Packard, all rights reserved.
//
//---------------------------------------------------------------------------
#ifndef COLLECTOR_CLASS
#define COLLECTOR_CLASS
/***********************************************************************
Module Name: collector.h/collector.cc
Module Overview
===============
This module provides the implementation of the collectors two interfaces:
the PRI/PMI and the NPRI/NPMI. THe operations are broken up two parts.
The PRI/PMI operators include:
        Collector::AddObserver(. .) - register observer
        Collector::AddSensor(. .) - register Sensor
        Collector::Data(. .) - report new sensor data
        Collector::DeleteSensor(. .) - delete observer sensor.
        Collector::DeleteObserver(. .) - delete observer
The above are handler routines that are called based on an observer's PRI request.
The NPRI/NPMI operators include:
        Collector::GetDirectory(. .) - returns observer and sensor lists to analyzers.
        Collector::DataRequest(. .) - Analyzer registers interest in observer/sensors.
        Collector::AddSensors(. .) - Register interest in additional sensor.
        Collector::ChangeInfoLevel(. .) - change reporting level of sensor.
        Collector::GetData(. .) - get latest sensor data.
        Collector::DeleteAnalyzer(. .) - remove analyzer.
        Collector::DeleteObservers(. .) - remove observer.
        Collector::DeleteSensors(. .) - remove sensor.
A typical way one of these handler routines is invoked is when a request is
received from either an observer via the ipc abstraction layer (for PRI/PMI
requests) or an analyzer via an rpc call (for NPRI/NPMI requests).
```

```
*************************************************************/
#include <constants.h>
#include <arrayList.h>
extern "C"
{
#include <pthread.h>
}
#include <dmsdaemon.h>
#include <dmsdaemonS.H>
#include "basic-defs.h"
#include <collector-ipc.h>
#include <baseDataType.h>
#include <observerEntry.h>
const long OBSERVERS_PER_NODE = 20;      // For optimum array size
const long COLLECTOR_CYCLE_SEC = 1;
const long COLLECTOR_CYCLE_MSEC = 1000;
class Collector : public dmsdaemon_2_0_ABS       // For DCE-RPC using C++ classes
{
    private:
        // Observers, sensor management
        pthread_mutex_t _observer_lock;    // MUTEX LOCK
        long _num_of_observers;            // Number of observers
        ArrayList _observers;              // Array of active observers
        // Analyzers management
        pthread_mutex_t _analyzer_lock;    // MUTEX LOCK
        long _num_of_analyzers;            // Number of analyzers
        ArrayList _analyzers;              // Array of analyzers
        // Delay for reading the IPC channel and RPC to analyzers
        long _delay_interval;              // in seconds
        // Log file to write the data
        FILE *_log_file;
        long _log_file_count;
    public:
        Collector( );
/*************************************************************
    The following functions are called to handle an observer's request. They
support the PRI/PMI collector interface (mostly the PRI). For example, they
support the registration of observers and sensors. The reporting of sensor
data, etc. . .
*************************************************************/
        // To add a new observer
        void AddObserver(long      /* Observer ID */,
                         char *    /* Service Name */,
                         char *    /* Directory */,
                         long      /* Observer pid */,
                         char *    /* hostname */);
        // To add a new sensor
        void AddSensor(long        /* Observer ID */,
                       long        /* Sensor ID */,
                       long        /* Number of Info. levels */,
                       long *      /* Pointer to data formats */,
                       char *      /* Sensor name */,
                       char *      /* Interface name */,
                       char *      /* Function (Manager) Name */);
        // Receiving new data from the Observers
        void Data(long             /* Observer ID */,
                  long             /* Sensor ID */,
                  char *           /* Pointer to the data region */,
                  int              /* Size of data */);
        // Deleting sensors
        void DeleteSensor(long     /* Observer ID */,
                          long     /* Sensor ID */);
        // Deleting observers
        void DeleteObserver(long /* Observer ID */);
        // Method called by the time_out functions to obtain the
        // time out interval.
        long GetDelayInterval( ) { return _delay_interval; };
            // to print the contents of the collector -- Observers, Sensors and data
        void Print( );                     // Print to screen
        long Write(FILE * = 0);            // Write to a file
/*************************************************************
The following functions are called to handle an analyzer's (PMT's) request.
They support the NPRI/NPMI collector interface The initial IPC protocol
was DCE/RPC.
*************************************************************/
        ObserverEntry* GetObserver (long observer_id);
        // Director service, to obtain Observer and Sensor names
        SensorDir_p GetDirectory(DirRequest * /* service */);
        // RPC call made by an analyzer requesting for data.
        // For a single Observer and multiple sensors within that observer
```

-continued

```
    // their information levels and frequency of updates
    long DataRequest(long           /* analyzer_id */,
                    long            /* time_interval */,
                    uuid_t          /* object_uuid */,
                    ServiceNames *  /* m_services */,
                    SensorNames *   /* m_sensors */,
                    CollectorID **  /* collector_id */);
    // To a set of sensors to an Observer
    long AddSensors(long            /* analyzer_id */,
                    long            /* service_id */,
                    long            /* frequency */,
                    SensorNames *   /* m_sensors */,
                    CollectorID **  /* collector_id */);
    // Analyzers changing information levels, frequency and
    // time_outs for a set of sensors
    long ChangeInfoLevel(long               /* analyzer_id */,
                         long               /* time_interval */,
                         ServiceFrequency * /* m_service_id */,
                         SensorInfoLevel *  /* m_sensor_id */);
    // Routine called periodically to transmit data
    void TransmitData( );
    // Analyzers directly obtaining data from the collectors
    GatheredData_p GetData(long /* analyzer_id */);
    long DeleteSensors(long       /* analyzer_id */,
                       ServiceID * /* service_id */,
                       Sensor ID * /* sensor_id */);
    long DeleteObservers(long     /* analyzer_id */,
                         ServiceID * /* service_id */);
    // To delete analyzers from the collectors
    long DeleteAnalyzer(long /* analyzer_id */);
};
// Set to determine debugging output mode.
extern int _verbose_mode;
#endif
//--------------------------------------------------------------------------
//
// File:        observer.h
// Description: Observer class definitions.
//
// Language:    C++
//
// © Copyright 1997, Hewlett-Packard, all rights reserved.
//
//--------------------------------------------------------------------------
#ifndef OBSERVER_CLASS
#define OBSERVER_CLASS
#include <sensor.h>
#include <baseDataType.h>
#include <arrayList.h>
#include <observerinfo.h>
#include <observer-ipc.h>
const long OBSERVER_CYCLE_SEC  = 5;
const long OBSERVER_CYCLE_MSEC = 5000;
// This class encapsulates all the Sensors contained in a service Its
// methods are accessed by watchdog threads off the RPC RTL timer queue
// periodically for shipping performance data across address spaces using Unix
// IPC mechanisms.
class ObserverClass : public BaseType
{
    private:
        char *_observer_name;      // user specified logical name
        int _num_of_sensors;
        int _sensor_id_gen;        // to generate unique Sensor Identifier used for
                                   // Sensor-Observer data transfer
        long _observer_id;         // unique Observer Identifier for Observer-Collector
                                   // data transfer
        ArrayList _sensors_list;   // list of Sensors contained in a service
        ObserverInfoClass *_observer_information; // controls summarization interval
IPC
        ObserverIPC*    dmsIPC;
    public:
        // constructor/destructor methods
        ObserverClass(char *, ObserverInfoClass * = 0);
        ~ObserverClass( );
        void SetObserverInfoClass(ObserverInfoClass *obs_info)
        {
            _observer_information = obs_info;
        };
        ObserverInfoClass *GetObserverInfoClass( )
        {
```

```
        return __observer__information;
    };
    // Interface to the Sensor Classes
    int AddSensor(SensorClass *);
    int DeleteSensor(SensorClass *);
    // For debugging
    void Print( );
    int Match(BaseType *);
    // periodically activated to push data to the Collector class
    void ObserveData( );
    // used by the instrumentation code for storing collected performance data.
    // Currently the interface method number used as the hash key to identify the
    // Sensor uniquely.
    BaseType* GetElement(long);
};
#endif
```

We claim:

1. A measurement system for monitoring quality of service of a distributed processing environment having a plurality of interconnected nodes and a plurality of application processes, each operating on one of the nodes, comprising:
   at least an intelligent sensor incorporated in each of the application processes to selectively collect, whenever the threshold information level for the sensor has been exceeded, data about the associated application process and the node upon which the associated application process operates into the local process address space of the sensor;
   an observer associated with the intelligent sensor to transfer the data collected by the intelligent sensor, wherein the observer eliminates data transfer of unchanged and zero values of the collected data in order to minimize data traffic in the measurement system, and copies control data into the configuration address space for each sensor;
   a collector logically associated with each network node;
   a collector data interface that asynchronously receives the intervalized collected data into the collector periodically pushed from the observer;
   an analyzer associated with the distributed processing environment to correlate the intervalized collected data;
   an analyzer data interface that asynchronously receives the intervalized collected data into the analyzer periodically pushed from the collector.

2. The measurement system of claim 1, wherein the intelligent sensor further comprises a registry storing a state of the intelligent sensor.

3. The measurement system of claim 1, further comprising a repository that stores configuration data for the intelligent sensor, observer, and collector for each application process.

4. The measurement system of claim 1, further comprising
   (I) a presenter that interactively produces a logically integrated view of the collected data provided by the analyzer;
   (II) an interpreter that evaluates and identifies complex relationship between the collected data provided by the analyzer; and
   (III) a controller that sets and modifies system parameters and configurations based on the collected data provided by the analyzer.

5. The measurement system of claim 1, wherein one of the application processes is a client object and another one of the application processes is a server object.

6. A method of measuring quality of service of a distributed process environment that includes a plurality of interconnected nodes and a plurality of application processes, each operating on one of the nodes, the method comprising the steps of:
   (A) selectively collecting, whenever the threshold information level for an intelligent sensor has been exceeded, data about the associated application process and the node upon which the associated application process operates using the intelligent sensor, wherein the data collected is stored into the local process address space of the sensor;
   (B) transferring the data collected by the intelligent sensor by an observer associated with the intelligent sensor in such a way that data transfer of unchanged and zero values of the collected data is eliminated in order to minimize data traffic, wherein the observer copies control data into the configuration address space for each sensor, wherein the step (B) further comprises the steps of
      forming internalized data from the collected data by eliminating data transfer of unchanged and zero values of the collected data;
      periodically pushing the intervalized collected data to a collector via a collector data interface;
   (C) periodically pushing the intervalized collected data to an analyzer associated with the distributed processing environment to correlate the intervalized collected data;
   (D) generating a correlated view of the intervalized collected data using an analyzer.

7. The method of claim 6, further comprising the step of encapsulating or embedding the intelligent sensor into the associated application process such that the intelligent sensor operates as part of the application process.

8. The method of claim 6, further comprising the step of configuring the intelligent sensor, the observer, and the collector for each application process in accordance with configuration data stored in a repository.

9. The method of claim 6, further comprising the steps of evaluating and identifying complex relationship between the collected data; and
   setting and modifying system parameters and configurations based on the collected data.

10. The method of claim 6, wherein one of the application processes is a client object and another one of the application processes is a server object, further comprising the step of capturing data pertaining to client-server interactions occurring between the client object and the server object.

* * * * *